May 16, 1944.  E. G. STAUDE  2,349,204
PAPER BOX MACHINE
Filed Aug. 4, 1941  11 Sheets-Sheet 1

INVENTOR
Edwin G. Staude

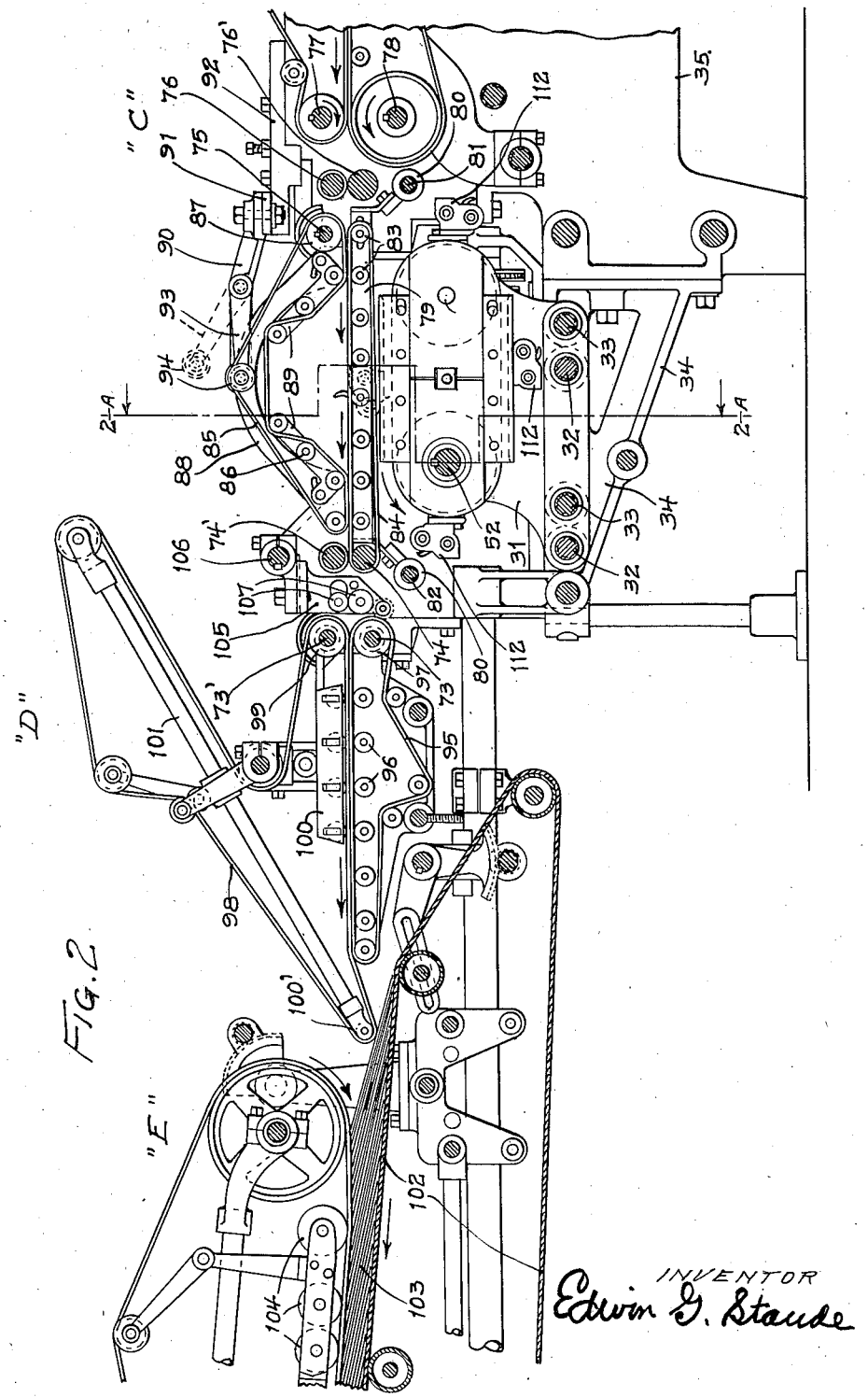

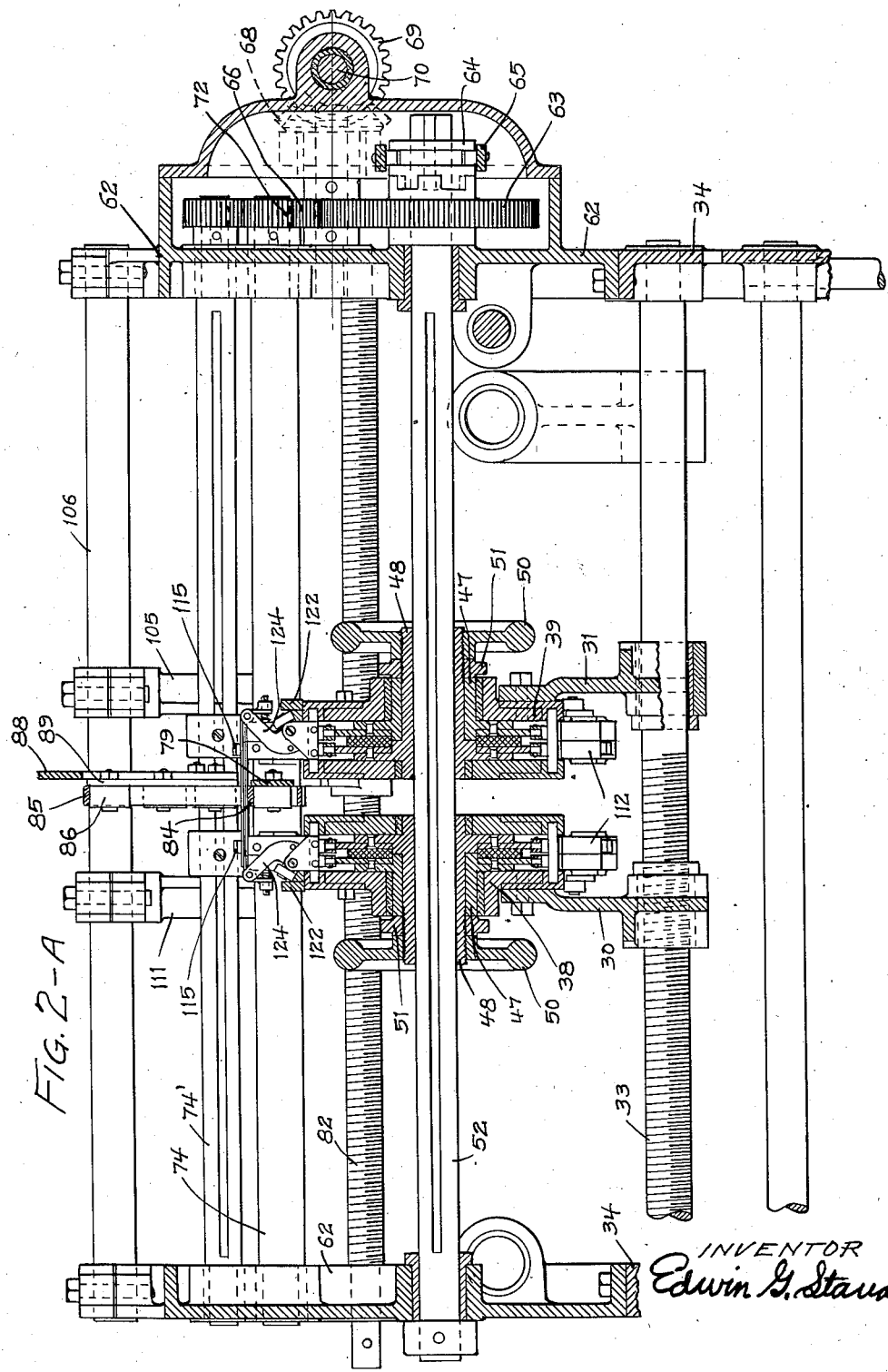

May 16, 1944. E. G. STAUDE 2,349,204
PAPER BOX MACHINE
Filed Aug. 4, 1941 11 Sheets-Sheet 4
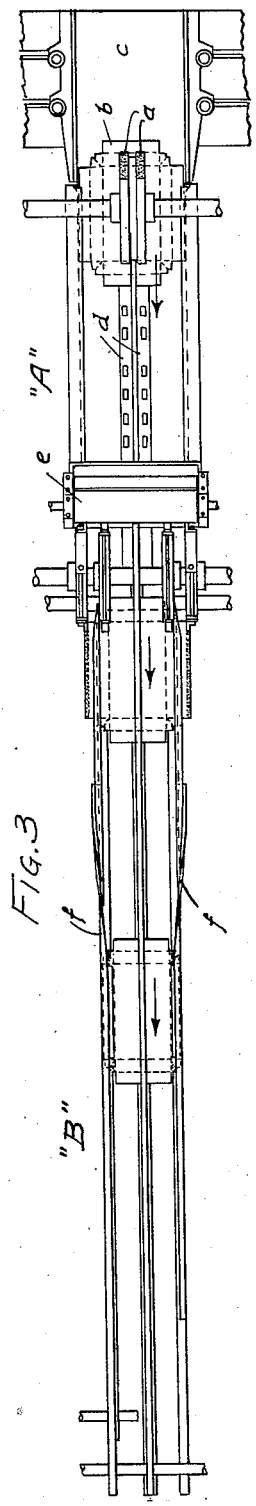
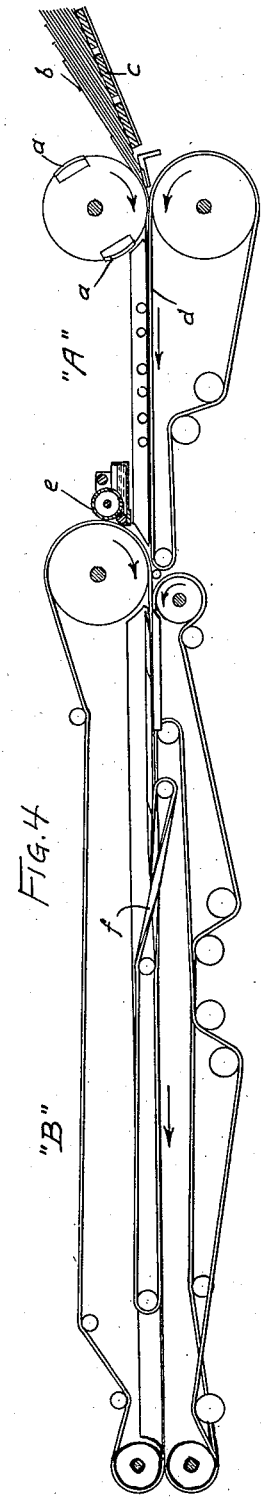
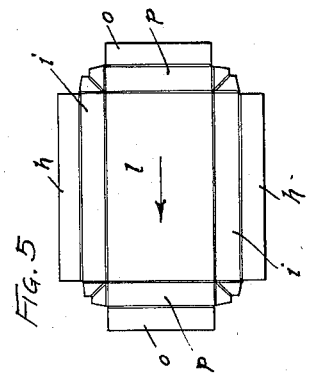
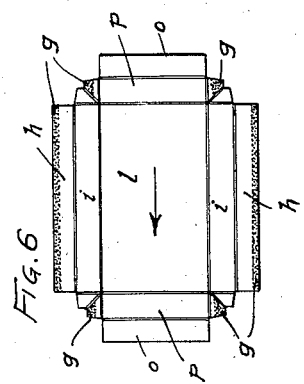
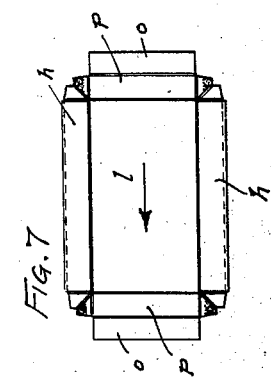
INVENTOR
Edwin G. Staude May 16, 1944.   E. G. STAUDE   2,349,204
PAPER BOX MACHINE
Filed Aug. 4, 1941   11 Sheets-Sheet 5
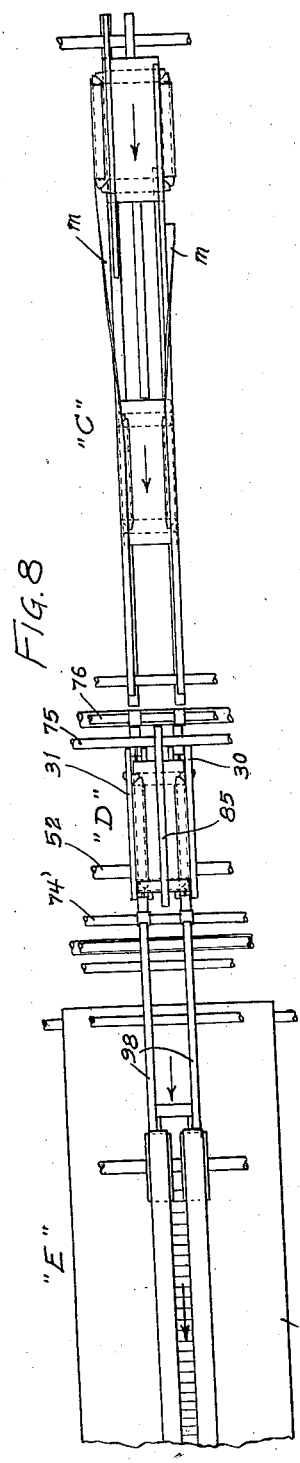
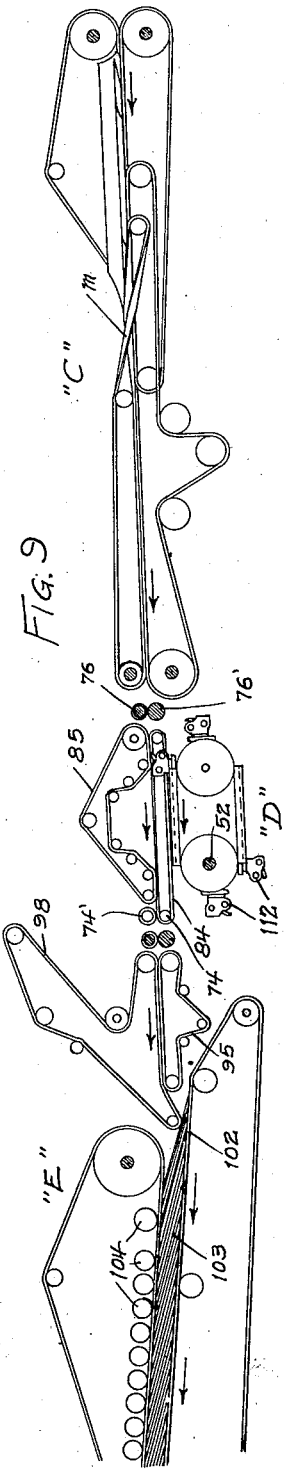
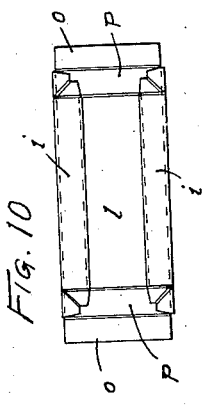
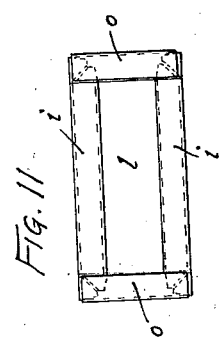
INVENTOR
Edwin G. Staude May 16, 1944.  E. G. STAUDE  2,349,204
PAPER BOX MACHINE
Filed Aug. 4, 1941   11 Sheets-Sheet 6
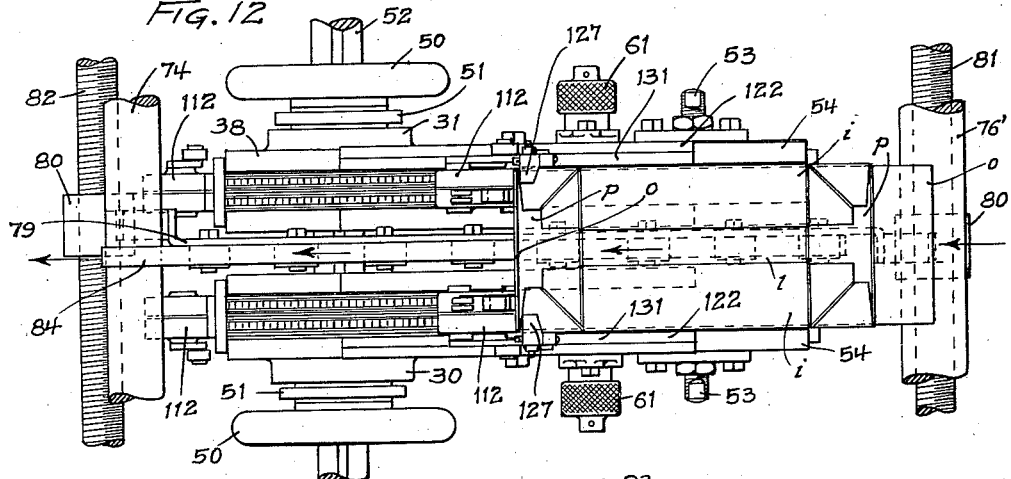
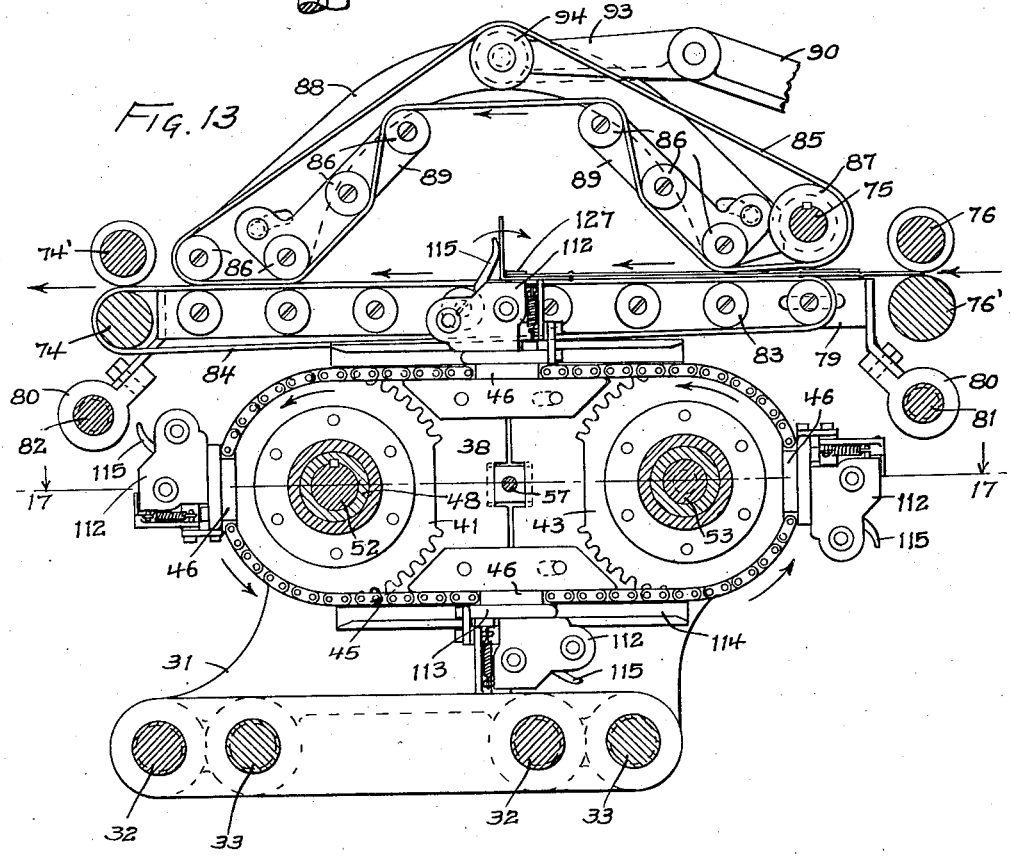
INVENTOR
Edwin G. Staude

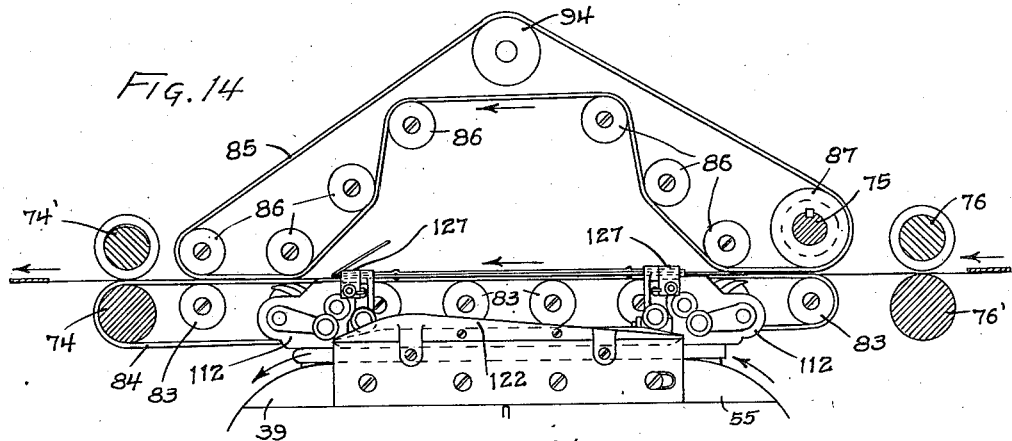
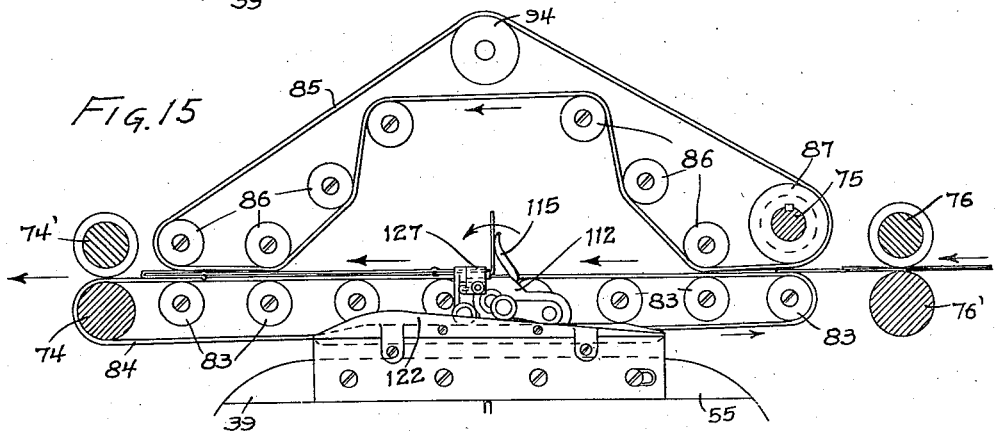
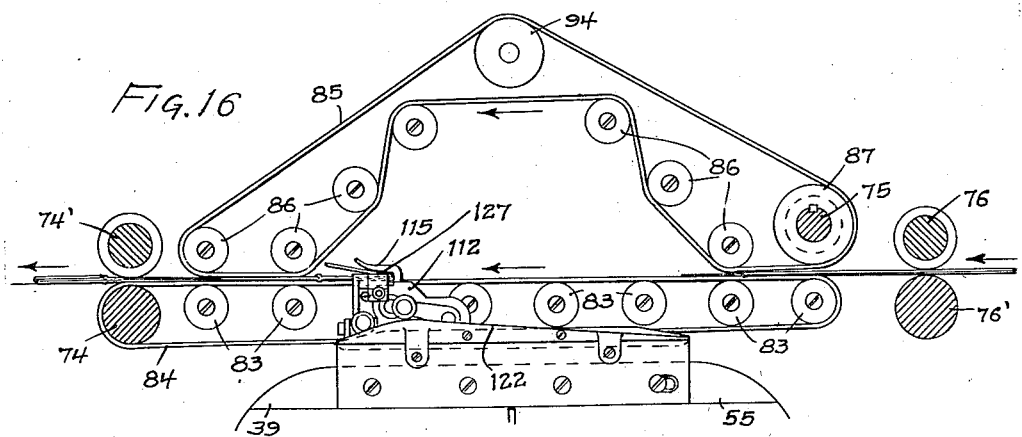

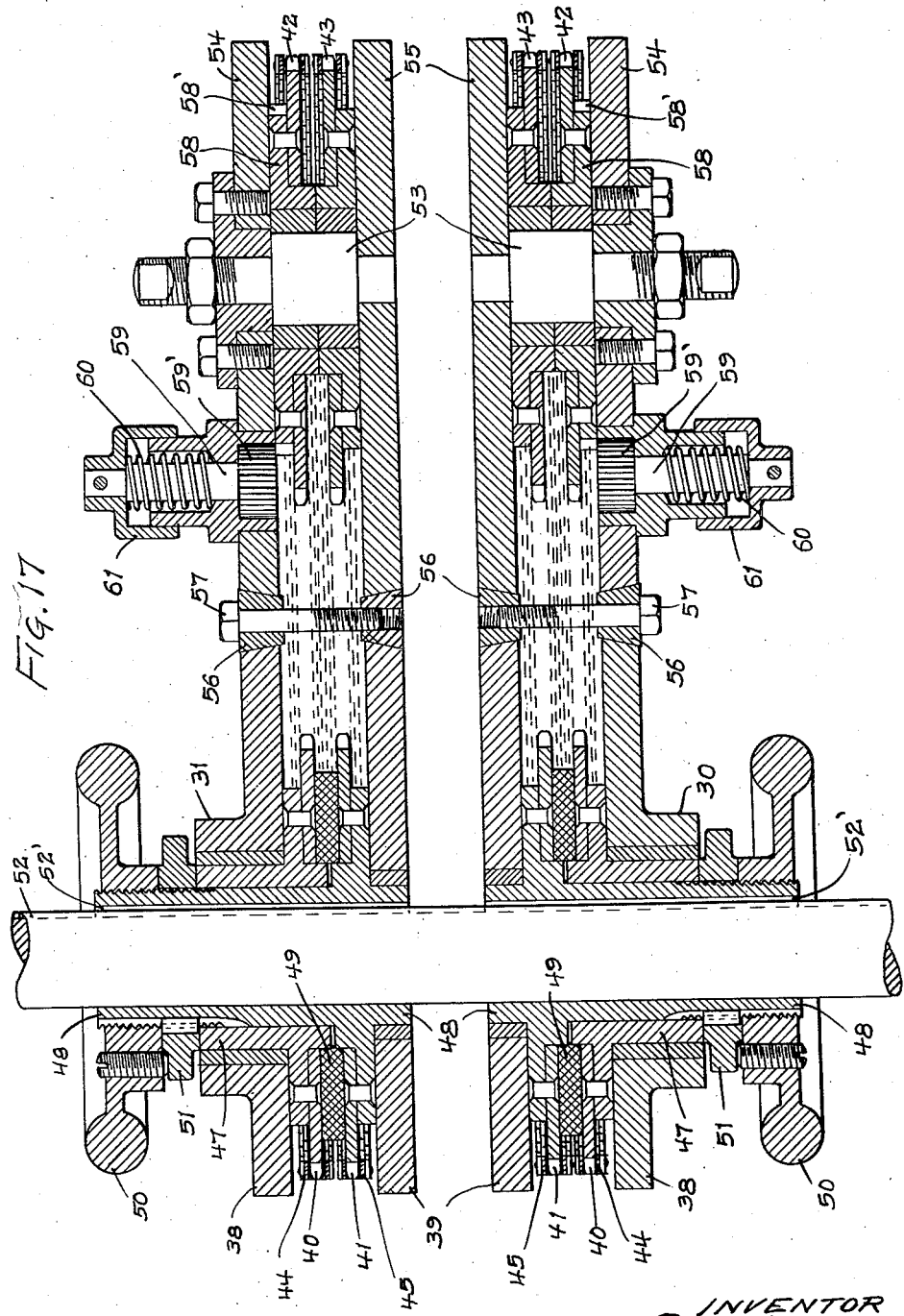

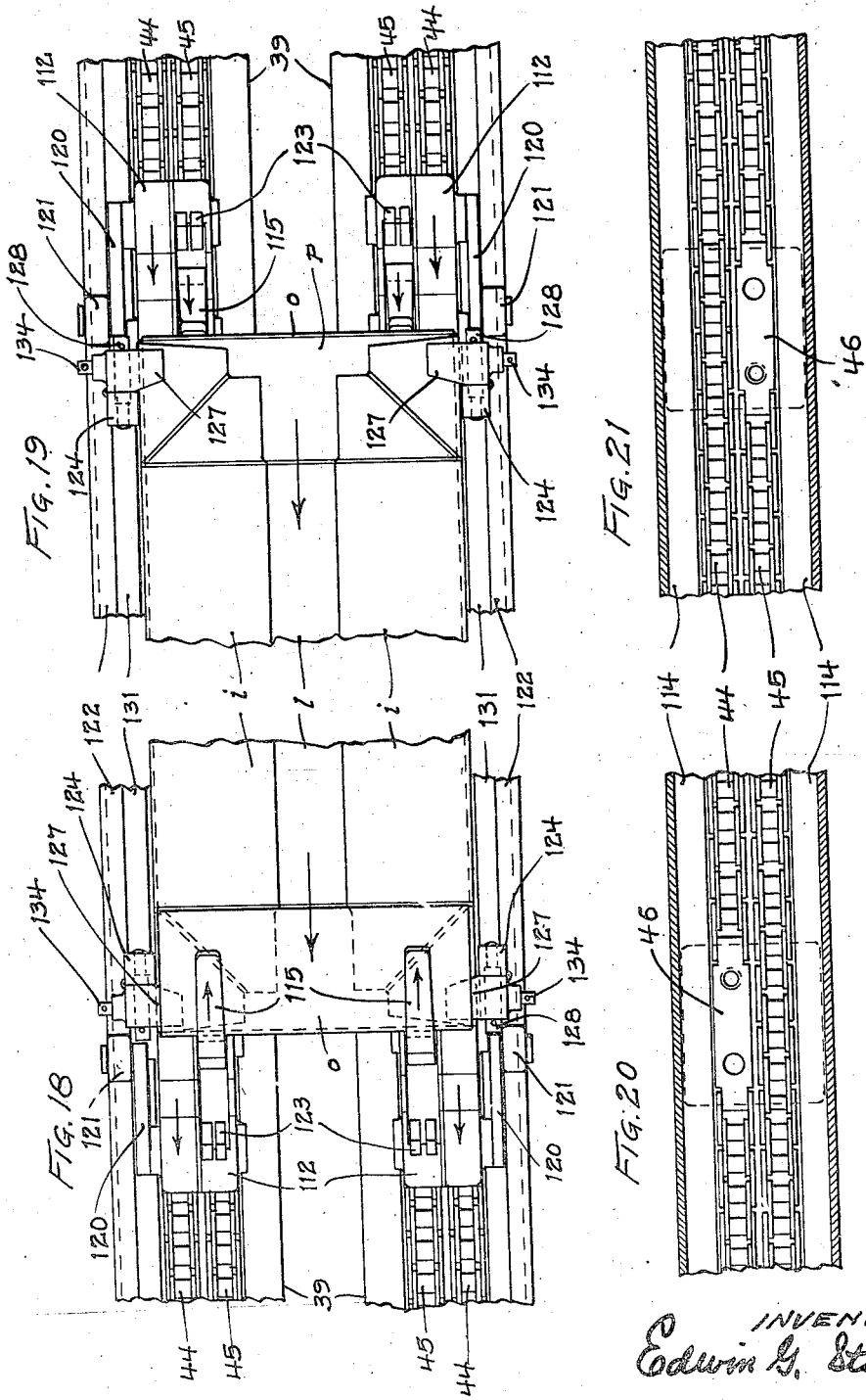

May 16, 1944. E. G. STAUDE 2,349,204
PAPER BOX MACHINE
Filed Aug. 4, 1941 11 Sheets-Sheet 10
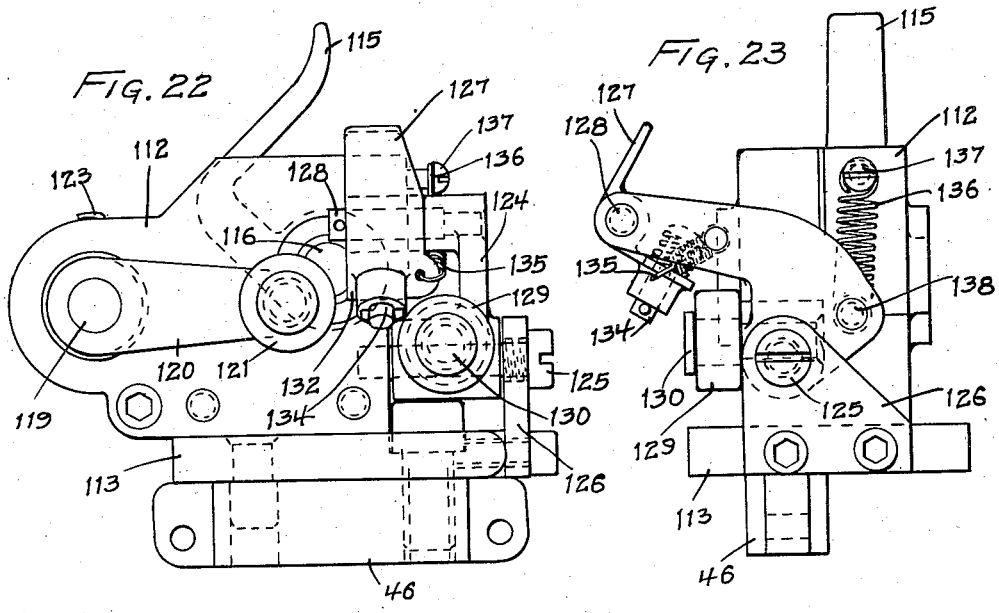
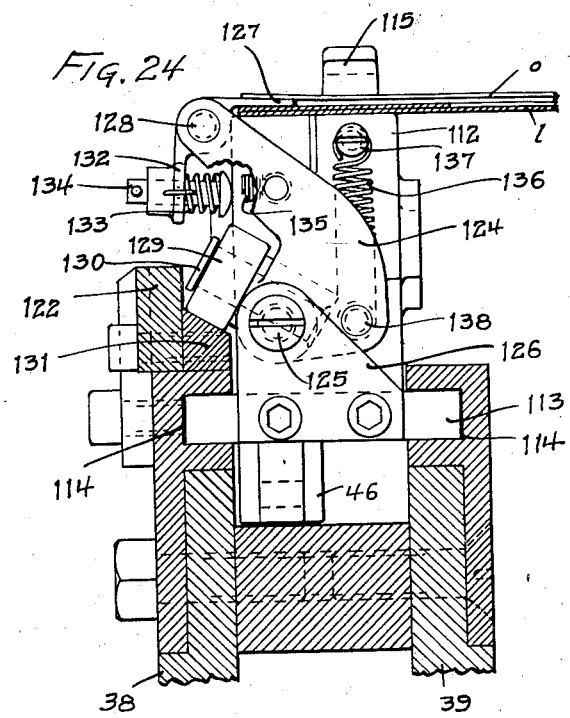
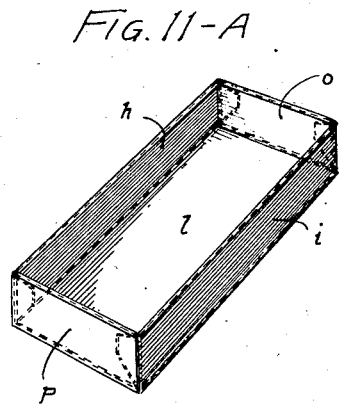
INVENTOR
Edwin G. Staude May 16, 1944.　　　E. G. STAUDE　　　2,349,204
PAPER BOX MACHINE
Filed Aug. 4, 1941　　　11 Sheets-Sheet 11
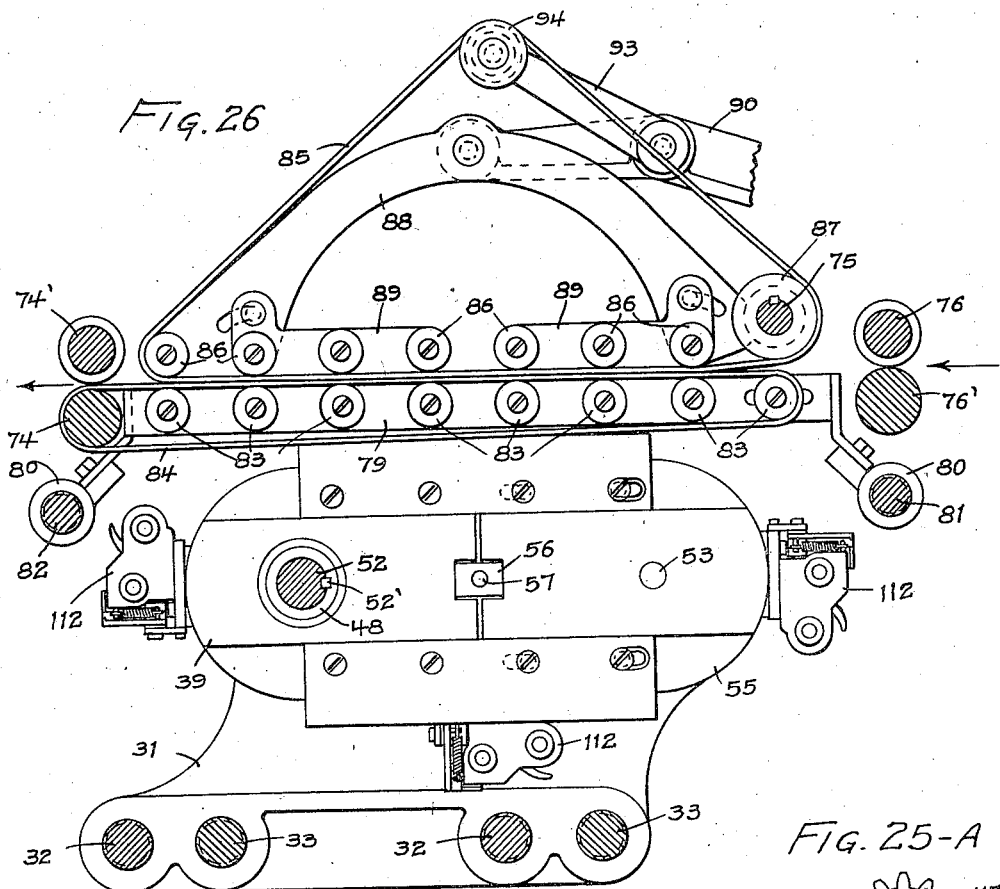
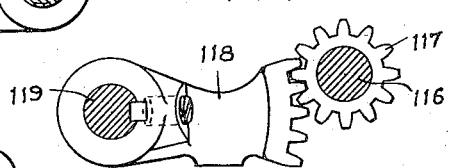
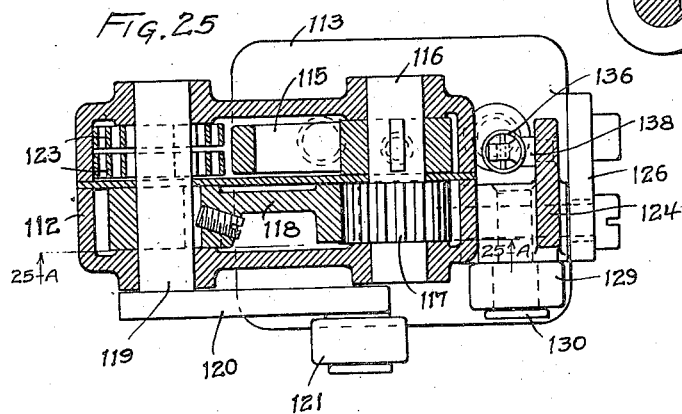
INVENTOR
Edwin G. Staude Patented May 16, 1944

2,349,204

UNITED STATES PATENT OFFICE 2,349,204

PAPER BOX MACHINE

Edwin G. Staude, Minneapolis, Minn.

Application August 4, 1941, Serial No. 405,325

19 Claims. (Cl. 93—49)

This invention consists of a new method for folding the end flaps of a collapsible setup box in a "straight-away" machine similar to that shown in Figures 11, 12, 13 and 14 of my Patent #2,008,049 dated July 16, 1935.

In the machine shown and described in the above patent, these end flaps are not folded over but the collapsible box is delivered without folding the end walls of the collapsible setup box.

Heretofore, where the customer required that the leading and trailing flaps be folded over the ends of the box, this was accomplished on a right angle machine of the type shown in Figure 1 of my Patent #1,144,506 dated June 29, 1915.

There are three major objections to the use of such a machine. The first is that the right angle machine is capable of gluing and folding only a limited type of collapsible setup boxes. In other words, it is not capable of gluing the full range of various types of folding cartons as the machine in Patent #2,008,049 is capable of.

The second disadvantage of a right angle machine is that it occupies an awkward amount of floor space and it is therefore quite difficult to arrange any number of these machines on a shop floor without wasting a considerable amount of floor space.

The third and most important disadvantage of a right angle machine is that it is difficult to apply sufficient pressure on the box blank over the glue seam in an adjustable machine. This is for the reason that suitable pressure in the delivery end of the machine must be exerted crosswise of the delivery of a collapsible box in order to insure correct sealing that is parallel to the side walls of the box and in addition also to secure the proper amount of pressure over the glue seam on the end of the collapsed box.

By running this same type of box in a "straight-away" machine, all of these objections are done away with for the reason that all of the glue seams are on each side of the box as it is delivered and therefore only two pressure devices are required, one on each side of the blank which pressure devices may be adjusted to accommodate boxes of various sizes.

The primary object of my invention is to provide a mechanism that will clamp the blank to a traveling folding unit and fold the leading and trailing flaps on previously creased lines.

A further object is to provide a leading and trailing flap folding mechanism which can be disengaged when not required and thus permit the running of ordinary cartons by the readjustment of the blank carrying elements.

In order to accomplish the general function set forth in my invention, I use the traveling folding units described in my Patent #1,910,413 dated May 23, 1933, with the exception that I must provide an especially designed folding unit to hold down the collapsed box while the ends are being folded for the reason that the end fold of both the leading and trailing flaps extend over the entire surface at right angle to the direction of travel and therefore it is impossible to provide any stationary "hold-down" bars or guide rods. My invention may be best understood by reference to the following drawings and specification in which Figure 1 is a plan view of the rear of a paper box machine of the type above described in Patent #2,008,049 to which my improved front and rear flap folding unit is attached.

Figure 2 is a vertical section through the mechanism shown in Figure 1 taken near the longitudinal center thereof. Figure 2—A is a vertical cross section on the line 2—A, 2—A of Figure 2 looking in the direction of the arrow. Figure 3 is a diagrammatic outline view showing the general manner of feeding, gluing and folding the first side wall fold which, when finally completed, will produce a collapsible setup box. Figure 4 is a vertical longitudinal section through the center of Figure 3. Figures 5, 6 and 7 show the successive steps of feeding, applying adhesive and making the first fold in the side walls of the blank.

Figure 8 is a plan view which shows a continuation of Figure 3 and shows the second folding of the side walls over onto the bottom of the blank and it also shows the location of my improved mechanism for folding the leading and trailing flaps over onto the leading and trailing end walls. This view is similar to Figure 13 in my Patent #2,008,049 except that the delivery end of the machine is separated from the final side wall folding mechanism in order to provide room for my present invention. Figure 9 is a vertical longitudinal section through the center of Figure 8. Figure 10 shows the manner in which this particular type of collapsible setup box is delivered in the machine shown and described in my Patent #2,008,049 and Figure 11 shows the manner in which by the use of my invention the leading and trailing flaps are folded over onto the leading and trailing end walls without changing the direction of travel of the blank.

Figure 11—A is a perspective view of the setup box of the box blank shown in collapsible condition in Figure 11. Figure 12 is a plan view on an enlarged scale of my invention showing the leading flap of the end wall of the collapsible setup box folded to a vertical position. Figure 13 is a vertical longitudinal section through the center of Figure 12. Figure 14 shows my invention for folding the leading and trailing flap over onto the body of the end wall in an advanced position over that shown in Figure 13.

This figure shows the leading flap nearly folded over under the body of the leading end wall and also shows the actuated cam for controlling the folding fingers and hold-down members.

Figure 15 is a view similar to Figure 14 except that it shows a further advanced position of the folding units in which the trailing flap is brought into a vertical position by the folding fingers before the said flap is folded over onto the body of the trailing end wall.

Figure 16 is a view similar to Figure 15 except that it shows a still further advanced view of the folded collapsible box and shows the trailing flap practically folded over the body of the trailing wall.

Figure 17 is a horizontal section of line 17—17 of Figure 13 drawn to a larger scale. Figure 18 is a partial plan view showing my invention including the gripping means for engaging the leading end of the folding collapsible setup box and also the manner in which the leading flap is folded over onto the body of the leading end wall.

Figure 19 is a view similar to Figure 18 except that it shows the grippers for engaging the trailing end of the collapsible setup box to hold down the end of the box and permit folding over the trailing flap onto the body of the end wall.

Figures 20 and 21 are details of the pair of chains, one for carrying one side of the folding mechanism, for folding the leading flap over onto the body of the leading end wall, and the other for folding the trailing flap over onto the body of the trailing end wall. These traveling chains in the general manner of adjusting are similar in construction as shown in my Patent #1,910,413.

Figure 1:
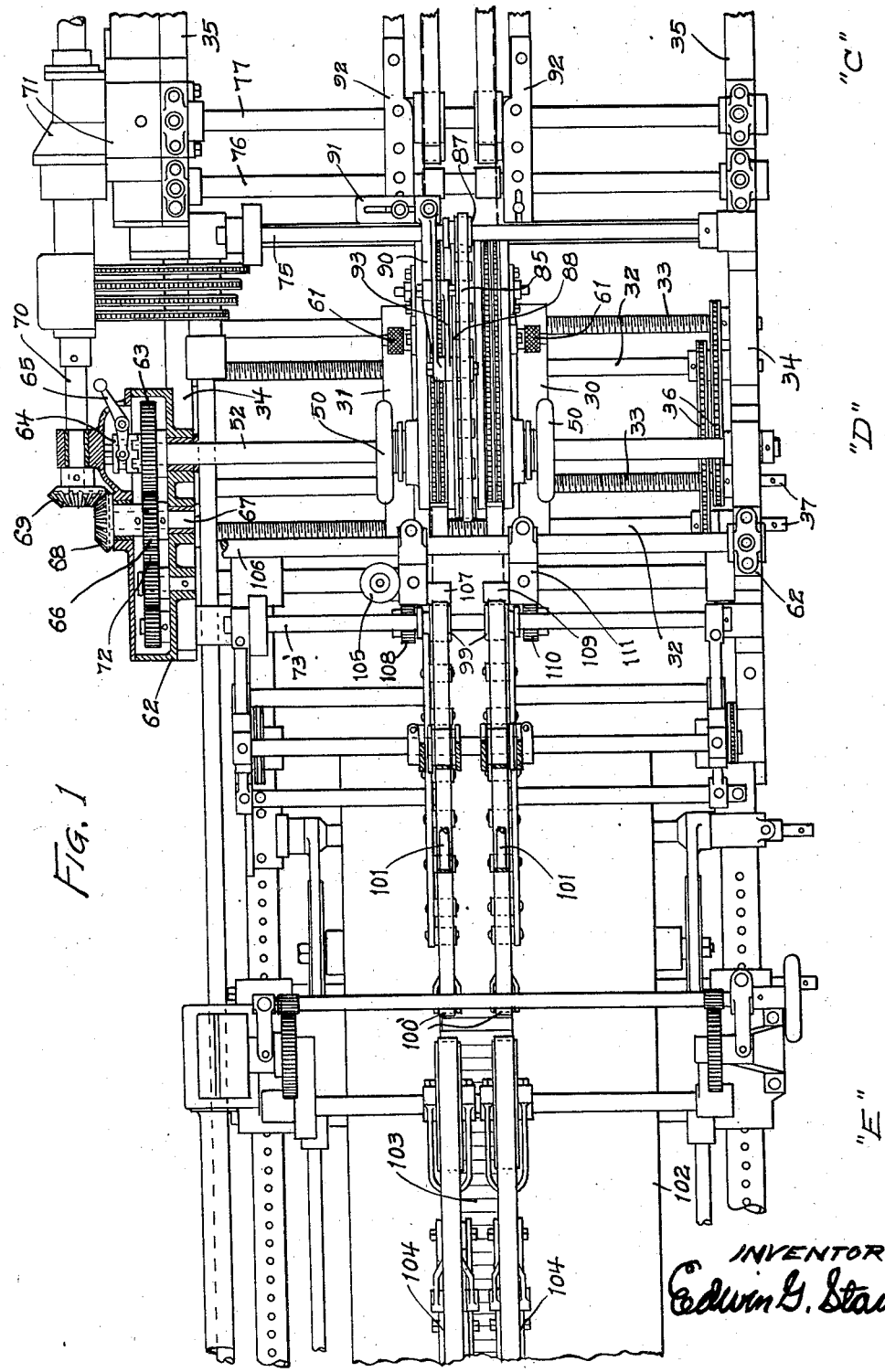

Figure 22 is a full size side view of one of the traveling folding heads and Figure 23 is an end view of Figure 22, both views showing the traveling folding unit in either partly disengaged or partly engaged positions. Figure 24 is a view similar to Figure 23 showing the flexible clamping member engaging the collapsed box at the proper point and clamping same into position to permit the accurate folding of the leading and trailing flap onto the body of the leading and trailing end wall at the same time advancing the folded collapsed box into the delivery mechanism since no other means to transfer said collapsed box is used.

Figure 25 is a horizontal section through the middle portion of the folding unit shown in Figure 22. Figure 25—A is a detail of the operating mechanism for the folder fingers in the folding unit 112. Figure 26 is a view similar to Figure 13 except that the mechanism of my invention is disconnected and inoperative and the usual carrier belts are arranged to transport ordinary cartons of folding boxes which do not require front and rear flap folding devices over the space utilized for the front and rear flap folding mechanism on collapsible setup boxes.

It is understood that the use of my special invention introduced at the rear of a folding paper box machine of the type is question does not in any way limit the use of a machine for gluing and folding all of the various types of cartons for which it was previously adapted.

It is, therefore, the purpose of my invention to introduce this mechanism on a machine whereby when the machine is set up to run collapsible boxes of the type shown, it may quickly be adjusted into position, and when such folding is not required it may likewise quickly be disengaged and the machine adjusted for ordinary carton work for which it previously was capable of gluing and folding.

Figures 3 and 8, and 4 and 9 show, when placed end to end, the straightaway arrangement of the travel of the blanks through the machine before they are acted upon by my improved leading and trailing flap folding mechanism.

This includes the timed feeding unit (a), the combined line and spot gluing and initial fold unit (B), the compound or second fold unit (C), the leading and trailing flap folding unit, (D), which comprises may invention, and the stacking unit (E), which is of similar construction to that shown in my Patent #2,133,727 dated October 18, 1938.

The unit (A) comprises a rotating feed wheel provided with rubber pads $a$ which draw a blank $b$ from the hopper $c$ and projects it onto the carrier belts $d$. The rubber feed pads $a$ feed the blank forward in timed relationship, that is, if the setup comprises one rubber feed pad on the feed wheel with a dummy block in the second feed wheel pad space, then obviously, the feed wheel will deliver only one blank per revolution. When the feed wheel is provided with two feed pads as shown, then the feed wheels will feed the two top blanks from the stack per revolution of the feed wheel.

Suitable timing chains not shown are then provided to give accurate register to the blank before it reaches the adhesive applying mechanism which includes revolving a glue drum $e'$.

Suitable pads not shown are maintained on a wheel $e$ to take adhesive from the glue drum $e'$ and apply it in the proper location on the blanks as at $g$ in Figure 6.

Folding belts $f$ for making the initial fold in the unit B are provided. Figure 5 shows the outline of the carton blank as it leaves the feed hopper $c$ while Figure 6 shows the adhesive location thereon and Figure 7 shows the extension side walls folded over as shown at $h$ onto the side wall body $i$.

The partly folded carton blank is conveyed through the machine by suitable carrier belts $k$. Figure 10 shows how the side wall panels $i$ of the carton are folded over onto the bottom panel $l$ by the twisted belts $m$ on the folding unit C while the belts $m$ carry the folded blank which is now compoundly folded except that it still requires a leading and trailing flap to be folded over onto the body of the end walls.

In the machine shown in Patent #2,008,049, the blank is delivered onto the delivery carrier and the side walls held under pressure. There is, however, this difficulty in that with the leading and trailing flaps left unfolded, the spot gluing on the diagonal portion of the end walls comprises two thicknesses of stock, whereas, the side walls, due to the fact that they are double and folded over onto the bottom, comprise three thicknesses. It is, therefore, somewhat difficult to get the same uniform pressure on the end walls that is obtained on the side walls, which frequently results in the end walls not being securely glued.

However, by folding over the flaps $o$ of the leading and trailing end walls onto the body of the end wall, a very important advantage is obtained because then the uniform thickness of three layers of stock prevails throughout the entire length of the collapsible box which position is shown in Figure 11.

It is clear that by having an ordinary pressure device over each side wall of uniform thickness throughout that a uniform pressure is obtained throughout the entire length of the box and therefore definitely insures a perfect adhesive seal both on the side walls and on the end walls.

This particular feature is an outstanding advantage in folding over the end flaps onto the end walls as shown in Figure 11. In order to accomplish the infolding of the leading and trailing flaps over the bottom of the end walls, I interpose this additional infolding unit D between the units C and E and also provide said unit D with suitable conveyor belts whereby ordinary cartons can be transferred from the unit C into the unit E when the infolding mechanism D is not required.

The new infold unit comprises a pair of laterally adjustable casings 30 and 31, supported on pairs of threaded cross-shafts 32—32 and 33—33 which are mounted in brackets, 34, extending from the rear end of the side frames, 35, of the folding unit C. (See Figure 2.) Each pair of said cross-shafts have sprockets which are connected by chains, 36, in pairs, so as to be moved in unison when a hand-crank is applied to the projecting ends, 37, of said shafts. As shown in Figure 17, each casing has side walls, 38 and 39 between which pairs of sprockets 40—41 and 42—43 are arranged at opposite ends therein and connected by chains 44 and 45 which have special links 46 at regular intervals for a purpose hereinafter described.

The sprocket 40 has a hub 47 journaled in the side wall 38 and in the side wall 39 surrounding the hub 48, the sprocket 41 is secured, while a friction disc 49 is disposed between said sprockets 40 and 41 and adapted to be clamped therebetween when a hand-wheel 50 is turned on its threaded engagement over the outer end of the hub 48, and thus acts to press a collar 51 against the outer end of the hub 47 so as to force the sprocket 40 against the disc 49 to firmly clamp said disc and said sprockets 40 and 41, when the proper adjustment has been made.

The hub 48 is splined on a drive shaft 52 by a spline 52' which then rotates both sprockets 40 and 41 together while the chains 44 and 45 thereon rotate the sprockets 42 and 43 on the stud 53 in the opposite end of the casing 30 and 31. The side walls 54 and 55 of the casing 30 and 31 may be moved forwardly by wedge-shaped blocks 56 which may be drawn together by a bolt 57 to tighten said chains to the correct tension. The hub flange 58 has gear teeth 58' on its periphery, which are disposed to be engaged by similar teeth 59' on a stub shaft 59 which is normally withdrawn by a spring 60 but adapted to be forced inwardly and rotated by a knurled hand-wheel 61 to move the sprocket 42 and chain 44 so as to rotate the sprocket 40 when the pressure on the friction disc 49 has been released, when adjustment of the mechanism is desired. With this mechanism the chain 44 may be moved independently of the chain 45 to increase or decrease the relative distance between their respective special links 46, for the purpose later on disclosed.

As shown in Figure 2—A, the casings 30 and 31 are oppositely arranged on the cross-shafts 32—32 and 33—33, with the hand-wheels 50 and 61 on the outside thereof, to allow said casings to be moved close together for extremely narrow cartons, and the drive shaft 52 extends across the machine and through bearings in vertical members 62 which are mounted on the brackets 34. A gear 63 is loosely arranged near one end of the shaft 52 and has a notched hub adapted to engage an oppositely notched clutch member 64 which is splined on said shaft so as to be moved out of engagement with the hub of said gear by a clutch lever 65 when it is desired to cease rotation of the drive shaft 52. The gear 63 is driven by a gear 66 on a short shaft 67 on which a bevel gear 68 is secured in position to mesh with a bevel gear 69 on a driven shaft 70 which extends from a transmission case 71 on the folder unit C. Intermediate gears 72 mesh with the gear 66 to drive the gears on cross-shafts 73, 73'; 74 and 74', while the cross-shafts 75, 76, 76', 77 and 78 are driven by gears in the transmission casing 71.

To carry the carton blanks across from the unit C to the unit E, above the casings 30 and 31, I arrange a bar 79 immediately above said casings, and each end of said bar is supported by collars 80 which are adjustably mounted on cross-shafts 81 and 82, and said cross-shafts are preferably threaded and adapted to be rotated in unison so as to simultaneously move said collars and both ends of said bar into any desired position with respect to the adjacent casings. Anti-friction rollers 83 are spaced apart on the bar 79 and support a belt 84 which is driven by the shaft 74, while a similar belt 85 is arranged on rollers 86 directly above the belt 84 and is driven by a pulley 87 on the shaft 75. Some of the rollers 86 are carried by an arched member 88 on which oppositely arranged arms 89 are adjustably hinged to carry the remaining rollers and belt 85 away from the belt 84 for a distance above the casings 30 and 31, as shown in Figure 13, for the purpose further on described. The arched member 88 is hinged on the outer end of an arm 90 which is firmly secured to a slotted plate 91, which, in turn, is adjustably secured to the top of the moveable frame member 92 of the folder unit C, and a belt tightener arm 93 is pivotally secured to the arm 90 and carries an idle pulley 94 to properly tension the belt 85.

With certain ordinary types of cartons it is unnecessary to use the infold unit D, which is then made inoperative by disconnecting the clutch member 64, and in such case the arms 89 are adjusted to a horizontal position, as shown in Figure 26, where the belt 85 is placed beneath the series of rollers 86 to contact the belt 84 and to cooperate therewith in conveying the carton blanks from the unit C to the unit E while the belt tightener arm 93 is adjusted to take up the slack in said belt 85. The unit D (see Fig. 2) is provided with conveying means consisting of lower belts 95 which are driven over a series of anti-friction rollers 96 by pulleys 97 on the shaft 73, while upper belts 98 are driven by pulleys 99 on the shaft 73' and forced against the belt 95 by a pressure roller device 100 as said belt 98 passes around a small roller 100' at the lower end of an adjustable device 101 which directs the folded cartons onto a slow-moving apron-belt 102 where they are overlapped to form a continuously moving stack 103 in which the glued surfaces are pressed together by a pair of pressure devices consisting of a train of heavy rolls 104 for a sufficient period of time to become securely joined before reaching the discharge end of the machine.

A carton counting device 105 is adjustably secured to a stationary cross-shaft 106 and is provided with a pair of pressure rolls 107 which are driven by a gear 108, while a similar pair of rolls 109 is driven by a gear 110 and is mounted in a bracket 111 on the shaft 106, and these rolls 107 and 109 serve to carry the smaller cartons across the space between the shafts 73 and 74 and also act to break the folded crease on each side or edge of the folded box.

The infolding operation involved in folding the extension end-flaps o inwardly over the end panels p of the carton blank, is accomplished by the folder heads 112, shown full size in Figures 22, 23, 24 and 25, which are attached to the special chain links 46 on the chains 44 and 45. These chains are independently adjusted with their respective sprockets so that the folder heads on one chain register with the leading end of the carton blank, as shown in Figures 12, 13 and 15, while the folder heads on the other chain register with the trailing end of the carton blank, as shown in Figures 16 and 17. The last mentioned heads are reversely arranged on the chain 45 so as to fold the trailing flap o in the direction of travel of said blank, while the heads on the chain 44 fold the leading flap against the direction of travel. Guide blocks 113 are secured between the heads and the special links 46 and are adapted to slide in guide-ways 114 to steady said heads during the folding operation of the curved finger 115 which projects through an opening in the top of said heads. As shown in Figure 25, the finger 115 is secured at its inner end to a shaft 116 by a key 116' which is journaled in one end of the head 112, and an integral gear pinion 117 on said shaft is disposed to mesh with the gear teeth on the limited periphery of an arm 118 which is secured to a shaft 119 in the other end of said head, while a crank arm 120 on the projecting outer end of the shaft carries a roller 121 at its extreme end which engages an inclined cam bar 122 (see Figures 15, 16 and 17) so as to slightly rotate the shaft 119 to swing the arm 118 upwardly which then turns the shaft 116 and swings the folding finger against the extension end flaps of the carton. A pair of spiral springs 123 have their inner end attached to the shaft 119 while their outer end is attached to the folder head so as to exert torsional pull on the shaft 119 which acts to return the folding finger 115 to its inactive position within said folder head when the roller 121 leaves the rear end of the cam bar 122.

In order to fold the leading and trailing flaps in over the end walls of the type of carton shown in Figure 5, it is necessary to direct the conveyor belt 85 upwardly over the space required for the infolding operation, as the end-flaps o extend the entire width of the folded carton, as shown in Figures 13, 15, 16 and 17 which prevents the use of hold-down rods or belts on the top of said carton when running ordinary cartons as shown in Figure 26 and for this reason some other means must be provided to hold the carton against the folder heads to define the folds and carry the partly folded box while the folding fingers 115 raise the flap o during the folding movement of said fingers. For this important purpose of holding the moving cartons in proper position during the infolding operation, I provide an arm 124 which is pivoted on a stud 125 mounted in one end of the folder head 112 and a plate 126 which is secured to the end of the guide-block 113, and a gripper plate 127 is hinged on a stud 128 at the upper end of said arm 124 in position to extend inwardly over the upper edge of the folder head and above the outer edge of the carton or box, which rests on said head, as shown in Figure 24 when folded into the condition shown in Figure 10. An anti-friction roller 129 is mounted on a stud 130 near the lower end of the arm 124 in position to ride up on a bevelled cam track 131 so as to swing the upper end of the arm 124 inwardly to the point shown in Figure 24 with the gripper plate above the edge of the carton. A depending portion 132 on said gripper plate 127 carries a compression spring 133 on a sliding pin 134 which is adapted to contact the side of the folder head 112 just before the gripper plate contacts the carton when said pin will compress said spring to exert pressure on the portion 132 which then acts to press the gripper plate down against the carton to hold said carton firmly against the folder heads during the infolding operation. A light tension spring 135 is provided between the arm 124 and the portion 132 to keep the gripper plate in an outwardly extending position normally until the pin 134 is forced against the folder head 112, while a larger tension spring 136 has one end attached at 137 to the upper part of the folder head and its lower end attached to a pin 138 at the lower end of the arm 124 so as to force the upper end of said arm outwardly to draw the gripper plate away from the carton when the roller 129 leaves the cam track 131 at the end of the infolding operation.

Figure 18 shows how the leading pair of folder heads are positioned by the chains 44 so that the gripper plates 127 thereon engage the outer edges of the carton at the leading end and immediately behind the extension flap thereon to define the fold while Figure 19 shows how the trailing pair of folder heads are placed by the chains 45 so that the gripper plates 127 thereon engage the carton immediately in front of the trailing extension flaps o, and Figures 20 and 21 show how the special links 46 are arranged on the chains 44 and 45 in alternated or staggered relation, so that the folder heads attached thereto may be adjusted by relative movement of said chains to increase or decrease the distance between each pair of folder heads to suit cartons of various lengths.

The mode of operation of my improved box machine is as follows: Box blanks properly died out of the type shown in Figure 5 are placed in the feed hopper c shown in Figures 3 and 4. These blanks b are fed forward by friction surfaces a on the feed wheel between suitable belts d and upper pressure devices and under glue applying members including glue mechanism e which conditions blank into the manner shown in Figure 6.

As the blank continues through the machine, the twisted folding belts f fold the blank into the condition shown in Figure 7. Further traveling of the blank through the machine folding belts m, Figure 9, folds the blank into the condition shown in Figure 10.

The partly folded blank then passes through my special leading and trailing flap infolding mechanism shown in Figures 12 and 13 and when the blank leaves this mechanism, it is in the condition shown in Figure 11.

From this point, the blank passes between a pair of traveling belts 95 and 98 which hold down the folded side flap and the portions of the end flaps and direct it onto a slowly moving conveyor, 102, where the glued side walls and the corner glued end walls are subjected under further pressure by a pair of upper pressure devices as shown in Figures 1 and 2 and Figures 8 and 9. After the folded blank emerges from under the pressure devices, the glue has had sufficient time to dry and the box is then in condition to be packed away for shipment in collapsed condition or even to be immediately set up ready for use.

I do not desire to limit my invention to strictly collapsible setup boxes, but it may also be used to fold flat articles such as envelopes and other paper goods.

I do not confine my invention to the precise construction shown, because, obviously, the mechanism may be varied in many respects and still perform the same function.

I claim:

1. In a paper goods blank gluing and folding machine; including means for feeding a blank, means for applying adhesive to said blank, means for folding the side walls of said blank over upon the body thereof on a crease line parallel with the direction of travel, comprising gripping means traveling with the blank for gripping and holding down the four corners of the partly folded blank, oscillating means traveling with the blank for folding the leading and trailing flaps over upon the end walls of the blank, means for applying pressure over said adhesive to insure adhesive juncture, and means for delivering said blank in collapsed condition.

2. In a paper goods blank gluing and folding machine; including means for feeding a blank, means for partly folding a blank, comprising gripper means traveling with the blank for gripping said blank near the transverse crease that defines the fold of the leading and trailing flaps, folding units traveling with the blank for folding the leading and trailing flaps on said transverse crease, means for delivering said blanks in lapped relationship.

3. In a paper goods blank gluing and folding machine adapted for feeding, folding, gluing and delivering a collapsed paper box, including means for partly folding a blank, comprising oscillating blank gripping means traveling with the partly folded blank to grip said partly folded blank near the four corners thereof and advance same, oscillating folding means traveling with said grippers and adapted to fold leading and trailing flaps on traverse lines with respect to direction of travel.

4. In a paper goods blank gluing and folding machine adapted for feeding, folding, gluing and delivering a collapsed paper box, comprising means for partly folding a blank, a blank gripping and folding member traveling with the partly folded blank to grip and advance said blank through the machine while leading and trailing flaps are folded, separate means for actuating said blank grippers and said folding members including oscillating arms for rocking shafts to operate separately first the gripping member and then the folding member and inclined cam for actuating said oscillating arms.

5. In a paper goods blank gluing and folding machine adapted for feeding, folding, gluing and delivering a collapsed paper box, including means for making initial folds in a box blank comprising: carrier units, separate blank grippers and separate blank folding units mounted on said carrier units, separate means for operating said grippers and said folding units, said combined blank gripping and folding units traveling with the initially folded blank to grip said blank near the corners thereof and advance same through the machine while leading and trailing flaps are folded and blank delivering means.

6. In a paper goods blank gluing and folding machine adapted to feed, fold, glue and deliver a collapsible paper box; comprising means for making initial folds in a box blank, plural blank gripping and folding members, endless carrier belts for advancing said plural blank gripping and folding members, a drive for said endless carrier belts, means for disengaging said drive to cause said endless carrier belts and said plural blank gripping and folding members to become inoperative, driven carrier belts to transport said blank past said space occupied by said gripping and folding members when said last named members are inoperative for the purpose specified.

7. In a paper goods blank gluing and folding machine adapted to feed, glue, fold and deliver a collapsible paper box; comprising means for making initial folds in a box blank, separate blank gripping and separate folding members mounted on a single carrier unit, endless carrier chains for advancing said carrier unit including said gripper and folding members, means for driving the endless carrier chains and the gripping and folding members, and means for adjusting said endless carrier chains independently of one another to vary the space between the gripper and folder means of one carrier relative to the gripper and folder means of another.

8. In a device of the class described; means for feeding a blank, an endless carrier for advancing said blank in timed relationship, means for making initial folds in said blanks, comprising endless carriers provided with blank gripping and folding units adapted to grip said initially folded blank and fold leading and trailing flaps on said blank while traveling with said blank, said gripping member of said gripping and folding unit comprising; a pivoted arm, a roller on said arm, a cam for actuating said roller, a spring for holding said roller in contact with said cam, a member pivoted on the end of said arm for gripping said blank onto the body of said gripping and folding unit, a spring for holding said member in raised position, a bumper on one end of said member for engaging the body of said gripping and folding unit, said bumper acting to clamp said member on said blank at the completion of the up stroke of said arm.

9. In a paper goods folding and gluing machine; including means for feeding the blank, means for advancing the blank, means for making initial and final folds in said blank, comprising dual means traveling with the blank, said final folding mechanism for first gripping and then folding the blank on transverse creases to the direction of travel and blank delivering means.

10. In a device of the class described; means for feeding a blank, including a means for folding the side walls of a box blank over the bottom comprising separate blank gripping and separate folding members both mounted in a single carrier unit, means for operating said gripping and folding members, a pair of belts one belt being adapted to advance the gripping and folding member for gripping and folding the leading flap and the other belt being adapted to advance the gripping and folding member for gripping and folding the trailing flap, means for adjusting the folding units one from the other to adapt same for blanks of different sizes and means for delivering said blank in folded collapsed condition.

11. A folding mechanism for paper box machines, comprising a plurality of endless carriers, means for driving the carriers, separate oscillating blank gripping and separate folding members both mounted in a single holder unit said unit being removably secured to said endless carriers, and means for adjusting the endless carriers relative to one another in direction parallel to and transverse to blank travel to adapt said blank gripping and folding mechanism for blanks of different sizes.

12. A folding mechanism comprising a plurality of endless carriers, means for driving said carriers, separate blank gripping members including a separate operating mechanism for same, and separate folding members having a separate operating mechanism, a single holder for supporting said gripping and folding members, said single holder being removably secured to said endless carriers, and means for adjusting said endless carriers, one from the other, to adapt same for blanks of different sizes.

13. In a unidirectional paper goods blank gluing and folding machine; including means for feeding a blank and advancing same through the machine, means for applying adhesive to said blank, means for folding a part of the side wall panels over upon itself, means for folding the double walled side wall panel over upon the body portion of said blank on a crease line parallel with the direction of travel, comprising a carrier unit, separate blank gripping and separate blank folding units mounted on said carrier unit, means for advancing said carrier unit with said blank, means for operating said gripping and said folding unit for gripping and folding a portion of the leading and trailing end flaps over upon the end walls on a crease line transverse to the direction of travel, means for applying pressure over said adhesive, and means for delivering said gluing and folding blanks in collapsed condition.

14. In a paper goods blank gluing and folding machine, including means for advancing the blank through the machine and folding the side walls on crease lines parallel with the direction of travel a separate leading and trailing gripping and folding mechanism, comprising a separate blank gripping unit for gripping and advancing said blank, a separate blank folding unit, said gripper and folding units traveling with the blank for gripping the blank and folding the leading and trailing flaps on crease lines transverse to the direction of travel, the axis of said gripping members and the axis of said folding members being at an angle to each other.

15. In a device of the class described having means for feeding a blank, means for advancing the blank, means for applying adhesive, initial folding means, final folding means, said final folding means comprising: endless carriers, folding units including oscillating folding fingers removably secured to said endless carriers, oscillating blank grippers for gripping said blank before final folding and advancing same during the final folding operation, means for applying pressure over said adhesive and means for delivering said glued and folded blank in collapsed condition.

16. In a unidirectional paper goods blank gluing and folding machine including means for feeding a blank in timed relationship with the gluing and folding mechanism, means for applying adhesive to said blank on predetermined areas, means for folding the side walls of the blank over the bottom of the blank on a crease line parallel with the direction of travel, an oscillating blank hold-down gripper adapted to operate near the inside of the end transverse crease of the partly folded blank, to clamp and advance said blank and travel therewith, a separate oscillating folding member for folding the end flap over the end walls of the blank while traveling with said blank, a traveling single carrier unit for supporting said gripper and said folding member, driving means for said single carrier unit, separate cam means for operating said gripper and said folding member, means for applying pressure over said adhesive and means for delivering said glued and folded blank in collapsed condition.

17. In a unidirectional paper goods blank gluing and folding machine including means for feeding a blank in timed relationship with the gluing and folding mechanism, means for applying adhesive to predetermined areas of said blank, means for folding the side walls of said blank over the bottom of said blank on a crease line parallel with the direction of travel, oscillating gripping means traveling with the blank for gripping said blank near transverse creases which define the fold of the leading or trailing end flaps and advancing same; oscillating folding means for doubling the leading or trailing end flap of said blank upon itself, a single carrier unit upon which said oscillating gripping means and said oscillating folding means are mounted, a pair of stationary cams located within the path of travel of said single carrier units one of said cams being adapted to operate the oscillating gripper means, the other cam being adapted to operate the oscillating folding means, means for applying pressure over said adhesive to insure adhesive juncture, and means for delivering said glued and folded blank in collapsed condition.

18. In a paper goods blank gluing and folding machine adapted for feeding the flat blanks and gluing, folding and delivering the converted collapsed paper boxes; including means for folding the side walls of a box blank over the bottom, blank gripping and folding means traveling with the partly folded blank to grip and fold the said partly folded blank near the four corners of the transverse crease which define the fold of the leading and trailing flaps, separate actuating means for said gripping and folding means, a lower carrier belt located adjacent to said gripping and folding means, an upper carrier belt cooperating with the upper stretch of said lower belt for advancing said box blank, adjustable means for the lower stretch of said upper belt to vary the contact with said upper stretch of said lower belt for the purpose specified.

19. In a paper goods blank gluing and folding machine adapted for feeding the flat blank and gluing, folding and delivering the converted collapsed paper boxes; including means for folding the side walls of the box blank; blank gripping and folding means traveling with the blank, to grip and fold leading or trailing flaps on said blank; separate actuating means for said gripping and folding means; lower carrier means located adjacent to said gripping and folding means; upper carrier means cooperating with said lower carrier means; said upper and lower carrier means being adapted to advance the blank when said gripping and folding means are removed for the purpose specified.

EDWIN G. STAUDE.